(12) United States Patent
Gou et al.

(10) Patent No.: US 12,028,163 B2
(45) Date of Patent: Jul. 2, 2024

(54) METHOD AND APPARATUS FOR DETERMINING HARQ-ACK CODEBOOK AND INFORMATION

(71) Applicant: ZTE CORPORATION, Guangdong (CN)

(72) Inventors: Wei Gou, Guangdong (CN); Peng Hao, Guangdong (CN); Xianghui Han, Guangdong (CN); Ting Fu, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 432 days.

(21) Appl. No.: 17/422,191

(22) PCT Filed: Dec. 27, 2019

(86) PCT No.: PCT/CN2019/129414
§ 371 (c)(1),
(2) Date: Jul. 10, 2021

(87) PCT Pub. No.: WO2020/143489
PCT Pub. Date: Jul. 16, 2020

(65) Prior Publication Data
US 2022/0131649 A1  Apr. 28, 2022

(30) Foreign Application Priority Data
Jan. 11, 2019 (CN) .......................... 201910028691.9

(51) Int. Cl.
*H04W 72/23* (2023.01)
*H04L 1/1812* (2023.01)
*H04L 5/00* (2006.01)
*H04W 72/0446* (2023.01)

(52) U.S. Cl.
CPC .......... *H04L 1/1812* (2013.01); *H04L 5/0053* (2013.01); *H04W 72/0446* (2013.01); *H04W 72/23* (2023.01)

(58) Field of Classification Search
CPC .. H04W 72/23; H04W 72/0446; H04L 5/0053
USPC ......................... 370/329, 400, 401, 402, 403
See application file for complete search history.

(56) References Cited

U.S. PATENT DOCUMENTS

| 2016/0157218 A1* | 6/2016 | Nam | .................... H04B 7/0632 370/329 |
| 2023/0247649 A1* | 8/2023 | Takahashi | ........... H04W 72/232 370/329 |

FOREIGN PATENT DOCUMENTS

| CN | 106559188 A | 4/2017 |
| CN | 107769825 A | 3/2018 |

(Continued)

OTHER PUBLICATIONS

WIPO, International Search Report dated Feb. 25, 2020.
(Continued)

*Primary Examiner* — Dang T Ton
(74) *Attorney, Agent, or Firm* — Li & Cai Intellectual Property (USA) Office

(57) ABSTRACT

Disclosed by the embodiments of the present application are a method and an apparatus for determining a HARQ-ACK codebook and HARQ-ACK information. The method for determining an HARQ-ACK codebook includes: setting a plurality of physical downlink shared channel (PDSCH) candidate resources having an overlapped time domain in a downlink slot into one candidate resource group, and determining HARQ-ACK information corresponding to the candidate resource group; and determining a corresponding downlink subslot for the HARQ-ACK information according to a preset rule, and determining a semi-static HARQ-ACK codebook. By means of the present application, the (Continued)

problem that a semi-static HARQ-ACK codebook cannot be determined when a PDSCH candidate resource is cross-subslot can be solved, thereby yielding the effect of meeting the HARQ-ACK requirement in the case that the PDSCH candidate resource is cross-subslot.

20 Claims, 3 Drawing Sheets

(56) References Cited

FOREIGN PATENT DOCUMENTS

| EP | 3876454 A1 | 9/2021 |
|---|---|---|
| WO | WO 2018204730 A1 | 11/2018 |

OTHER PUBLICATIONS

URLLC/eMBB differentiation and enhancement to semi-static ACK/NACK codebook issued on Nov. 16, 2018, 3GPP TSG RAN WG1 Meeting #95.

DL intra UE Tx prioritization for URLLC issued on Nov. 16, 2018, 3GPP TSG RAN WG1 Meeting #95.

Remaining issues on HARQ-ACK codebook issued on Apr. 20, 2018, 3GPP TSG RAN WG1 Meeting #92b.

UCI enhancements for URLLC issued on Nov. 16, 2018, 3GPP TSG RAN WG1 Meeting #95.

European Patent Office, EP19908219.9 Supplementary Partial European Search Report dated Sep. 8, 2022.

ZTE, "URLLC/eMBB differentiation and enhancement to semi-static ACK/NACK codebook", 3GPP Draft, issued on Nov. 3, 2018.

* cited by examiner

METHOD AND APPARATUS FOR DETERMINING HARQ-ACK CODEBOOK AND INFORMATION

The present application is a National Stage of International Application No. PCT/CN2019/129414, filed Dec. 27, 2019, which claims priority from Chinese patent application No. 201910028691.9, entitled "METHOD AND APPARATUS FOR DETERMINING HARQ-ACK CODEBOOK AND INFORMATION" filed with the China Patent Office on Jan. 11, 2019, both of which are hereby incorporated by reference in their entireties.

TECHNICAL FIELD

The present application relates to the field of communications, and in particular to a method and an apparatus for determining a HARQ-ACK codebook and HARQ-ACK information.

BACKGROUND

In the research of NR R16, in order to support Ultra Reliable Low Latency Communication (URLLC) service transmission and reduce time transmission of Hybrid Automatic Repeat Request-Acknowledge (HARQ-ACK) corresponding to a Physical Downlink Shared Channel (PDSCH) in the downlink transmission, some companies have proposed a Physical Uplink Control Channel (PUCCH) for transmitting HARQ-ACK multiple times in one uplink slot, so as to reduce HARQ-ACK transmission latency.

Optionally, in order to support the above functions, a solution is provided in which a slot is divided into multiple subslots so that both an uplink slot and a downlink slot are correspondingly divided into multiple subslots, and then the subslots are used as slots in an existing slot-based method to determine a timing position of HARQ-ACK and a PUCCH resource.

However, when the downlink slot is also divided into subslots correspondingly, since allocation of the existing PDSCH candidate resources is determined based on a slot manner, if the allocation of the existing PDSCH candidate resources is reused, there may be a case where the PDSCH allocated for one or more PDSCH candidate resources is cross-subslot. Then, there are problems with how to deal with the case of a cross-subslot PDSCH candidate resource, especially how to determine the semi-static HARQ-ACK codebook. However, no solution has proposed yet in the related art.

SUMMARY

Embodiments of the present application provide a method and an apparatus for determining a HARQ-ACK codebook and HARQ-ACK information which can solve at least the problem that a semi-static HARQ-ACK codebook cannot be determined when a PDSCH candidate resource is cross-subslot in the related art.

According to an embodiment of the present application, provided is a method for determining an HARQ-ACK codebook, including: setting a plurality of PDSCH candidate resources having an overlapped time domain in a downlink slot into one candidate resource group, and determining HARQ-ACK information corresponding to the candidate resource group; and determining a corresponding downlink subslot for the HARQ-ACK information according to a preset rule, and determining a semi-static HARQ-ACK codebook.

Optionally, the step of determining the HARQ-ACK information corresponding to the candidate resource group includes: determining, for the candidate resource group in the downlink subslot, a position in the subslot of the HARQ-ACK information corresponding to the candidate resource group according to a PDSCH candidate resource with an earliest end position in the candidate resource group.

Optionally, determining a position in the downlink subslot of the HARQ-ACK information corresponding to a PDSCH candidate resource in the downlink subslot includes: determining the position in the subslot of the HARQ-ACK information corresponding to the PDSCH candidate resource according to a sequence of end positions of the PDSCH candidate resources in the downlink subslot.

Optionally, the preset rule includes: taking a downlink subslot where an end position of a PDSCH candidate resource with an earliest end position in the candidate resource group is located as the downlink subslot corresponding to the HARQ-ACK information; or taking a downlink subslot where a start position of a PDSCH candidate resource with the latest start position in the candidate resource group is located as the downlink subslot corresponding to the HARQ-ACK information.

Optionally, the preset rule further includes: taking a downlink subslot where an end position of a PDSCH candidate resource with a latest end position in the candidate resource group is located as the downlink subslot corresponding to the HARQ-ACK information; or taking a downlink subslot where an end position of a PDSCH candidate resource with an earliest start position in the candidate resource group is located as the downlink subslot corresponding to the HARQ-ACK information; or taking a downlink subslot where an end position of a PDSCH candidate resource with a latest start position in the candidate resource group is located as the downlink subslot corresponding to the HARQ-ACK information.

Optionally, the preset rule further includes: taking a downlink subslot where a start position of a PDSCH candidate resource with an earliest end position in the candidate resource group is located as the downlink subslot corresponding to the HARQ-ACK information; or taking a downlink subslot where a start position of a PDSCH candidate resource with a latest end position in the candidate resource group is located as the downlink subslot corresponding to the HARQ-ACK information; or taking a downlink subslot where a start position of a PDSCH candidate resource with an earliest start position in the candidate resource group is located as the downlink subslot corresponding to the HARQ-ACK information.

Optionally, the step of determining the semi-static HARQ-ACK codebook includes: counting the HARQ-ACK information corresponding to the candidate resource group into the downlink subslot, and determining a position of the HARQ-ACK information corresponding to the candidate resource group in the semi-static HARQ-ACK codebook according to a sequence of downlink subslots.

Optionally, the step of setting the plurality of PDSCH candidate resources having the overlapped time domain in the downlink slot into the candidate resource group includes: determining a PDSCH candidate resource with an earliest end position in the slot or the downlink subslot; and dividing the PDSCH candidate resource with the earliest end position and a PDSCH candidate resource having an overlapped time domain with the PDSCH candidate resource with the earliest end position into the candidate resource group.

Optionally, the method further includes: determining a PDSCH candidate resource with an earliest end position among PDSCH candidate resources in the slot or the downlink subslot except the PDSCH candidate resources divided into the candidate resource group; and dividing the PDSCH candidate resource with the earliest end position and a PDSCH candidate resource having an overlapped time domain with the PDSCH candidate resource with the earliest end position into a new candidate resource group, until all the PDSCH candidate resources in the slot or the downlink subslot are divided into candidate resource groups.

Optionally, when the downlink subslot is empty, Negative Acknowledgement (NACK) information is filled into the semi-static HARQ-ACK codebook, or HARQ-ACK information of 0 bits is determined in the downlink subslot.

Optionally, the downlink subslot is determined to be empty by one of: determining that there is no PDSCH candidate resource or candidate resource group in the downlink subslot, and there is no counted PDSCH candidate resource or candidate resource group in the downlink subslot; or determining that a PDSCH candidate resource or the candidate resource group exists in the downlink subslot but is prohibited from being counted in the downlink subslot, and there is no counted PDSCH candidate resource or candidate resource group exist in the downlink subslot.

Optionally, the step of determining that the PDSCH candidate resource or the candidate resource group exists in the downlink subslot includes: determining that a symbol corresponding to an end position of the PDSCH candidate resource exists in the downlink subslot, and/or, determining that a symbol corresponding to a start position of the PDSCH candidate resource exists in the downlink subslot.

Optionally, the downlink subslot is determined to be non-empty by one of: determining that a counted candidate resource group exists in the downlink subslot, or determining that a PDSCH candidate resource or the candidate resource group exists in the downlink subslot, and the PDSCH candidate resource or the candidate resource group is not counted in another subslot.

Optionally, the method further includes: determining, when a candidate resource group of another downlink subslot is counted in the downlink subslot, HARQ-ACK information corresponding to the counted candidate resource group in the downlink subslot, and determining a position of the HARQ-ACK information in the semi-static HARQ-ACK codebook.

According to another embodiment of the present application, provided is a method for determining HARQ-ACK information, including: determining PDSCH candidate resources in a downlink subslot corresponding to a semi-static HARQ-ACK codebook; determining a quantity of HARQ-ACK information in the downlink subslot, according to the PDSCH candidate resources in the downlink subslot and a maximum number of PDSCH candidate resources transmitted in the downlink subslot without overlapping in a time domain; and taking a sum quantity of the HARQ-ACK information in the downlink subslot as a quantity of the semi-static HARQ-ACK codebook.

Optionally, the step of determining a PDSCH candidate resource in the downlink subslot corresponding to the semi-static HARQ-ACK codebook includes: determining the PDSCH candidate resource according to a symbol corresponding to an end position of the PDSCH candidate resource in the downlink subslot and/or a symbol corresponding to a start position of the PDSCH candidate resource in the downlink subslot.

Optionally, the step of determining the quantity of HARQ-ACK information in the downlink subslot, according to the PDSCH candidate resources in the downlink subslot and the maximum number of the PDSCH candidate resources transmitted in the downlink subslot without overlapping in the time domain, includes: determining a PDSCH candidate resource with an earliest end position in the slot or the downlink subslot; dividing the PDSCH candidate resource with the earliest end position and a PDSCH candidate resource having an overlapped time domain with the PDSCH candidate resource with the earliest end position into one candidate resource group; and determining the quantity of the HARQ-ACK information in the downlink subslot according to a quantity of the candidate resource groups. The candidate resource group corresponds to one or more pieces of HARQ-ACK information.

Optionally, the method further includes: determining a PDSCH candidate resource with an earliest end position among the PDSCH candidate resources in the slot or the downlink subslot except the PDSCH candidate resources divided into the candidate resource group; and dividing the PDSCH candidate resource with the earliest end position and a PDSCH candidate resource having an overlapped time domain with the PDSCH candidate resource with the earliest end position into a new candidate resource group, until all the PDSCH candidate resources in the slot or the downlink subslot are divided into candidate resource groups.

According to another embodiment of the present application, provided is an apparatus for determining HARQ-ACK information, including: a second determination module configured to determine PDSCH candidate resources in a downlink subslot corresponding to a semi-static HARQ-ACK codebook; a third determination module configured to determine a quantity of HARQ-ACK information in the downlink subslot according to the PDSCH candidate resources in the downlink subslot and a maximum number of PDSCH candidate resources transmitted in the downlink subslot without overlapping in a time domain; and a fourth determination module configured to take a sum quantity of the HARQ-ACK information in the downlink subslot as a quantity of the semi-static HARQ-ACK codebook.

According to still another embodiment of the present application, there is further provided a storage medium having a computer program stored thereon. The computer program is configured to be executed to cause steps of any one of the above method embodiments to be implemented.

According to still another embodiment of the present application, there is further provided an electronic apparatus, including a memory and a processor. The memory has a computer program stored thereon, and the processor is configured to execute the computer program to implement steps of any one of the method embodiments as described above.

By means of the present application, the problem that a semi-static HARQ-ACK codebook cannot be determined when a PDSCH candidate resource is cross-subslot can be solved, thereby yielding the effect of meeting the HARQ-ACK requirement in the case that the PDSCH candidate resource is cross-subslot.

BRIEF DESCRIPTION OF THE DRAWINGS

The accompanying drawings, which are included to provide optical further understanding of the present application and are incorporated in and constitute a part of the present application, illustrate embodiment(s) of the present application and together with the description serve to explain the present application and not to limit the present application. In the drawings.

DETAILED DESCRIPTION

The present application will be described in detail below with reference to the accompanying drawings in conjunction with embodiments. It should be noted that the embodiments of the present application and features therein may be combined with each other in any manner as long as they are not contradictory.

It should be also noted that terms "first", "second", and the like in the description, claims and drawings of the present application are used for the purpose of distinguishing similar objects instead of indicating a specific order or sequence.

Embodiment 1

Figure 1:
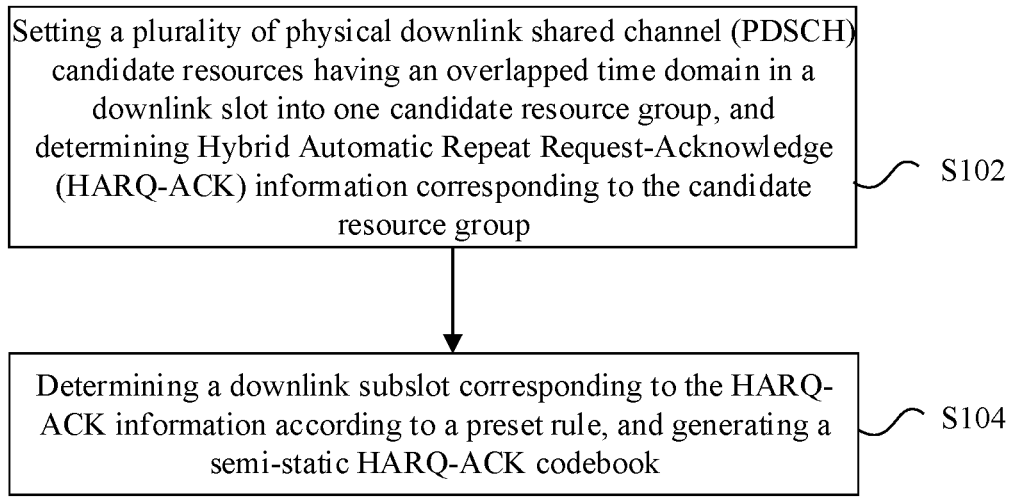
FIG. 1 is a flowchart of determining a HARQ-ACK codebook according to an embodiment of the present application.

In this embodiment, provided is a method for determining an HARQ-ACK codebook. FIG. 1 is a flowchart of determining a HARQ-ACK codebook according to an embodiment of the present application. As shown in FIG. 1, the flow includes the following steps.

At step S102, setting a plurality of PDSCH candidate resources having an overlapped time domain in a downlink slot into one candidate resource group, and determining HARQ-ACK information corresponding to the candidate resource group.

At step S104, determining a downlink subslot corresponding to the HARQ-ACK information according to a preset rule, and generating a semi-static HARQ-ACK codebook.

This step may alternatively include determining a corresponding downlink subslot for the candidate resource group according to a preset rule, and then determining the HARQ-ACK information of the candidate resource group. The final result of the two is the same. The former firstly determines the HARQ-ACK information of the candidate resource group, then counts the HARQ-ACK information into the determined subslot, and finally determines a semi-static HARQ-ACK codebook. The latter firstly determines the subslot corresponding to the candidate resource group, and then determines the HARQ-ACK information of the candidate resource group. The subslot corresponding to the candidate resource group refers to the subslot into which the HARQ-ACK information of the candidate resource group is to be counted. Finally, in either method, the HARQ-ACK information of the candidate resource group is counted into the corresponding subslot, and the semi-static HARQ-ACK codebook is finally determined. Optionally, the step of determining the HARQ-ACK information corresponding to the candidate resource group includes: determining a position in the subslot of HARQ-ACK information corresponding to each PDSCH candidate resource according to a sequence of end positions of the PDSCH candidate resources in the downlink subslot. When the downlink subslot includes the candidate resource group, the position in the subslot of the HARQ-ACK information is determined according to a PDSCH with an earliest end position in the candidate resource group.

Optionally, the step of determining the HARQ-ACK information corresponding to the candidate resource group includes: determining, for the candidate resource group in the downlink subslot, a position in the subslot of the HARQ-ACK information corresponding to the candidate resource group, according to a PDSCH candidate resource with the earliest end position in the candidate resource group.

Optionally, determining a position in the downlink subslot of HARQ-ACK information corresponding to a PDSCH candidate resource in the downlink subslot includes: determining the position in the subslot of the HARQ-ACK information corresponding to the PDSCH candidate resource according to a sequence of end positions of the PDSCH candidate resources in the downlink subslot.

Specifically, it is given here that when each subslot includes a plurality of PDSCHs (including an original candidate resource group in the subslot and a counted candidate resource group), a position of the HARQ-ACK of each PDSCH in the HARQ-ACK information of the subslot is determined according to the sequence of end positions of the PDSCHs. The position of the HARQ-ACK information of one candidate resource group in the subslot is determined according to the earliest ended PDSCH in the candidate resource group.

Optionally, the preset rule includes: taking a downlink subslot where an end position of a PDSCH candidate resource with the earliest end position in the candidate resource group is located as the downlink subslot corresponding to the HARQ-ACK information; or taking a downlink subslot where a start position of a PDSCH candidate resource with the latest start position in the candidate resource group is located as the downlink subslot corresponding to the HARQ-ACK information.

Optionally, the preset rule further includes: taking a downlink subslot where an end position of a PDSCH candidate resource with the latest end position in the candidate resource group is located as the downlink subslot corresponding to the HARQ-ACK information; or taking a downlink subslot where an end position of a PDSCH candidate resource with the earliest start position in the candidate resource group is located as the downlink subslot corresponding to the HARQ-ACK information; or taking a downlink subslot where an end position of a PDSCH candidate resource with the latest start position in the candidate resource group is located as the downlink subslot corresponding to the HARQ-ACK information.

Optionally, the preset rule further includes: taking a downlink subslot where a start position of a PDSCH candidate resource with the earliest end position in the candidate resource group is located as the downlink subslot corresponding to the HARQ-ACK information; or taking a downlink subslot where a start position of a PDSCH candidate resource with the latest end position in the candidate resource group is located as the downlink subslot corresponding to the HARQ-ACK information; or taking a downlink subslot where a start position of a PDSCH candidate resource with the earliest start position in the candidate resource group is located as the downlink subslot corresponding to the HARQ-ACK information.

Optionally, the step of determining the semi-static HARQ-ACK codebook includes: counting the HARQ-ACK information corresponding to the candidate resource group into the downlink subslot, and determining a position of the HARQ-ACK information corresponding to the candidate resource group in the semi-static HARQ-ACK codebook according to a sequence of downlink subslots.

For example, when one semi-static HARQ-ACK codebook corresponds to a plurality of subslots, a position in the semi-static HARQ-ACK codebook of HARQ-ACK information in each subslot needs to be determined according to the subslots. For example, the position in the semi-static HARQ-ACK codebook of the HARQ-ACK information in each subslot is determined according to a sequence of the subslots.

Optionally, the step of setting the plurality of PDSCH candidate resources having the overlapped time domain in the downlink slot into the candidate resource group includes: determining a PDSCH candidate resource with the earliest end position in the slot or the downlink subslot; and dividing the PDSCH candidate resource with the earliest end position and a PDSCH candidate resource having an overlapped time domain with the PDSCH candidate resource with the earliest end position into the candidate resource group.

Optionally, the method further includes: determining a PDSCH candidate resource with the earliest end position among PDSCH candidate resources in the slot or the downlink subslot except the PDSCH candidate resources divided into the candidate resource group; and dividing the PDSCH candidate resource with the earliest end position and a PDSCH candidate resource having an overlapped time domain with the PDSCH candidate resource with the earliest end position into a new candidate resource group, until all the PDSCH candidate resources in the slot or the downlink subslot are divided into candidate resource groups.

Apparently, when there is no PDSCH candidate resource having an overlapped time domain with the PDSCH candidate resource with the earliest end position, the candidate resource group includes only the PDSCH candidate resource with the earliest end position. The overlapped time domain here includes a completely overlapped time domain and a partially overlapped time domain.

Optionally, when the downlink subslot is empty, NACK information is filled into the semi-static HARQ-ACK codebook, or HARQ-ACK information of 0 bits is determined in the downlink subslot.

Optionally, the downlink subslot is determined to be empty by one of: determining that there is no PDSCH candidate resource or candidate resource group in the downlink subslot, and there is no counted PDSCH candidate resource or candidate resource group in the downlink subslot; or determining that a PDSCH candidate resource or the candidate resource group exists in the downlink subslot but is prohibited from being counted in the downlink subslot, and there is no counted PDSCH candidate resource or candidate resource group in the downlink subslot.

Optionally, the step of determining that the PDSCH candidate resource or the candidate resource group exists in the downlink subslot includes: determining that a symbol corresponding to an end position of the PDSCH candidate resource exists in the downlink subslot, and/or determining that a symbol corresponding to a start position of the PDSCH candidate resource exists in the downlink subslot.

Optionally, the downlink subslot is determined to be non-empty by one of: determining that a counted candidate resource group exists in the downlink subslot; or determining that a PDSCH candidate resource or the candidate resource group exists in the downlink subslot, and the PDSCH candidate resource or the candidate resource group is not counted in another subslot.

Optionally, the method further includes: determining, when a candidate resource group of another downlink subslot is counted in the downlink subslot, HARQ-ACK information corresponding to the counted candidate resource group in the downlink subslot, and determining a position of the HARQ-ACK information in the semi-static HARQ-ACK codebook.

Figure 2:
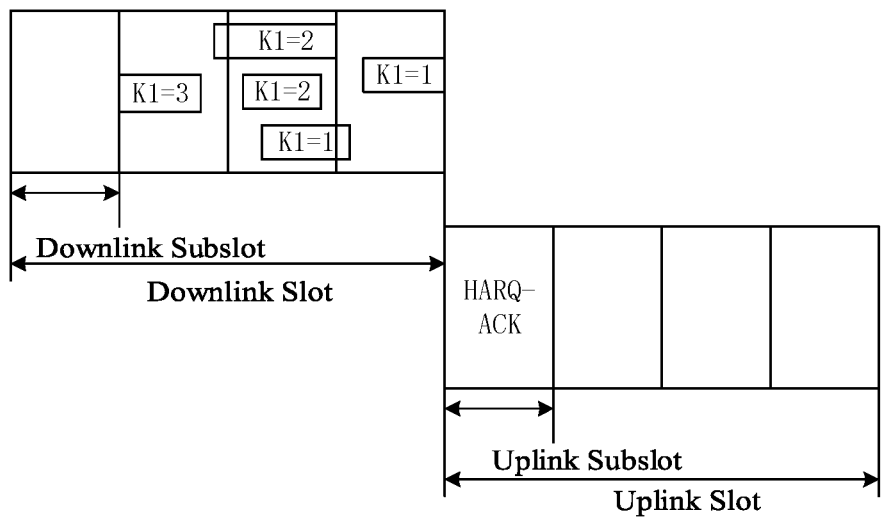
FIG. 2 is a schematic diagram of determined slots of a HARQ-ACK codebook according to an embodiment of the present application.

If there is no original PDSCH candidate resource or original PDSCH candidate resource group (including a PDSCH candidate resource group not counted into a subslot 1 according to a preset rule) in the subslot 1, there is no need to generate HARQ-ACK for the subslot 1, or fill NACK in the subslot 1. If there an original PDSCH candidate resource or original PDSCH candidate resource group exists in a subslot 2, but the original PDSCH candidate resource or the original PDSCH candidate resource group is counted into another subslot according to a preset rule (and no other PDSCH candidate resources or PDSCH candidate resource groups are counted into the subslot 2 according to the preset rule), there is no PDSCH candidate resource or PDSCH candidate resource group requiring HARQ-ACK information in the subslot 2, and thus there is no need to generate HARQ-ACK for the subslot 2 or fill NACK in the subslot 2. For whether a PDSCH candidate resource belongs to a subslot, it is determined according to a subslot where a start or end symbol of the PDSCH candidate resource is located. For example, if an end symbol of a PDSCH candidate resource 1 is located in a subslot 3, then the PDSCH candidate resource 1 belongs to the subslot 3. For a PDSCH candidate resource, a method for determining a subslot to which the candidate resource group belongs is also applicable. In this case, it is considered that one candidate resource group includes the PDSCH candidate resource, and then the corresponding subslot is determined according to the preset rule. In other scenarios, similar processing may be adopted. In fact, generally speaking, if a start position and an end position of a PDSCH candidate resource are both in the same subslot, the PDSCH candidate resource belongs to the subslot and no further determination of the subslot it belongs to is needed. If a start position and an end position of a PDSCH candidate resource are not in the same subslot, the above method may be adopted to determine the subslot it belongs to. Generally speaking, if start positions and end positions of all PDSCH candidate resources in a PDSCH candidate resource group are in the same subslot, the PDSCH candidate resource group also belongs to that subslot. If at least one PDSCH candidate resource in a PDSCH candidate resource group has a start position and an end position in different subslots, the subslot corresponding to the PDSCH candidate resource group needs to be determined according to the preset rule, so as to facilitate determination of the position of the corresponding HARQ-ACK information in the HARQ-ACK codebook. It should be noted that by "original", it means being configured for UE through RRC signaling. FIG. 2 is a schematic diagram of determined slots of a HARQ-ACK codebook according to an embodiment of the present application. As shown in FIG. 2: it is assumed in FIG. 2 that one slot is divided into 4 subslots, and then a value of the parameter k1 of HARQ-ACK timing is in units of subslots. It is assumed that a value set of k1 configured for UE by the base station is {1, 2, 3, 4}. FIG. 2 is applicable to Frequency Division Duplexing (FDD) or Time Division Duplexing (TDD).

Assuming that a semi-static HARQ-ACK codebook of UE is transmitted in a first uplink subslot (denoted as subslot n) in FIG. 2, then according to the value of k1, UE calculates that the previous subslots n−k1 are downlink subslots corresponding to the HARQ-ACK codebook. That is, the 4 downlink subslots in FIG. 2 are all downlink subslots corresponding to the semi-static HARQ-ACK codebook in the subslot n.

In FIG. 2, 5 PDSCH candidate resources are configured in the downlink slot, and the positions are as shown. Among them, 3 PDSCH candidate resources have an overlapped time domain. Each of these PDSCH candidate resources is counted into a corresponding subslot according to a subslot where the last symbol of the PDSCH candidate resource is located (this determines the corresponding subslot for the PDSCH that has no overlapped time domain). In this manner, actually no PDSCH candidate resource is allocated to the first subslot, while one PDSCH candidate resource exists in the second subslot, two PDSCH candidate resources exist in the third subslot, and two PDSCH candidate resources exist in the fourth subslot.

In FIG. 2, to determine the semi-static HARQ-ACK codebook, the PDSCH candidate resource with the earliest end time is firstly found from the PDSCHs in the slot/subslot, and then divided into a group with the PDSCH having an overlapped time domain with the PDSCH candidate resource with the earliest end time. If there is no PDSCH candidate resource having an overlapped time domain with the PDSCH candidate resource with the earliest end time, a separate group is created to form a piece of HARQ-ACK message for a group of PDSCH candidate resources in the future. Then, the remaining PDSCH candidate resources are sequentially subjected to the above operation until all the PDSCH candidate resources are divided into corresponding groups. According to the above rules, the first PDSCH candidate resource in FIG. 2 forms a group, which is marked as the first group (here, the first group has only one PDSCH candidate resource, and is generally referred to as a non-time-domain-overlapping PDSCH candidate resource; and a non-time-domain-overlapping PDSCH candidate resource generally forms a separate group), the 2nd, 3rd, and 4th PDSCH candidate resources form a group, which is marked as the second group, and the 5th PDSCH candidate resource forms a group, which is marked as the third group.

Optionally, to facilitate understanding of the above technical solution, the following scenarios are provided in this embodiment regarding the preset rule describe above.

Scenario 1

The preset rule includes: taking a downlink subslot where an end position of a PDSCH candidate resource with the earliest end position in the candidate resource group is located as the downlink subslot corresponding to the HARQ-ACK information.

In FIG. 2, HARQ-ACK of the first group of PDSCH candidate resources corresponds to the second subslot, HARQ-ACK of the second group of PDSCH candidate resources corresponds to the third subslot, and HARQ-ACK of the third group of PDSCH candidate resources corresponds to the fourth subslot. In this case, if one piece of HARQ-ACK information is generated for one group of PDSCH candidate resources, then one piece of HARQ-ACK information is generated in the second downlink subslot, one piece of HARQ-ACK information is generated in the third downlink subslot, and one piece of HARQ-ACK information is generated in the fourth downlink subslot.

In FIG. 2, for the first downlink subslot, when the semi-static HARQ-ACK codebook is in the first uplink subslot, since there is a value of k1=4, it is also considered as a downlink subslot corresponding to the semi-static HARQ-ACK codebook, and at this time, since there is no corresponding PDSCH candidate resource or candidate resource group, NACK may be generated and filled in the semi-static HARQ-ACK codebook. However, the best solution is to remove such a subslot (the first downlink subslot) from the subslots for which HARQ-ACK information is generated (i.e., no corresponding HARQ-ACK is generated for such a subslot), when generating the semi-static HARQ-ACK codebook, since no corresponding PDSCH candidate resource exists therein or since no HARQ-ACK for a candidate resource group is counted therein. In this manner, the HARQ-ACK overhead can be reduced. According to the above method, the HARQ-ACK information contained in the semi-static HARQ-ACK codebook generated in Scenario 1 sequentially includes: the one piece of HARQ-ACK information of the 2nd downlink subslot, the one piece of HARQ-ACK information of the 3rd downlink subslot, and the one piece of HARQ-ACK information of the 4th downlink subslot.

It should be uniformly noted that, in Scenario 1 as well as the scenarios described below, the HARQ-ACK information pieces and the candidate resource groups are in one-to-one correspondence. There may be only one PDSCH candidate resource in each candidate resource group (in the case of no overlapped time domain). The HARQ-ACK information of the candidate resource group is counted into one of the subslots to determine sizes of the semi-static HARQ-ACK codebooks and bit positions of HARQ-ACK in different uplink subslots.

Figure 3:
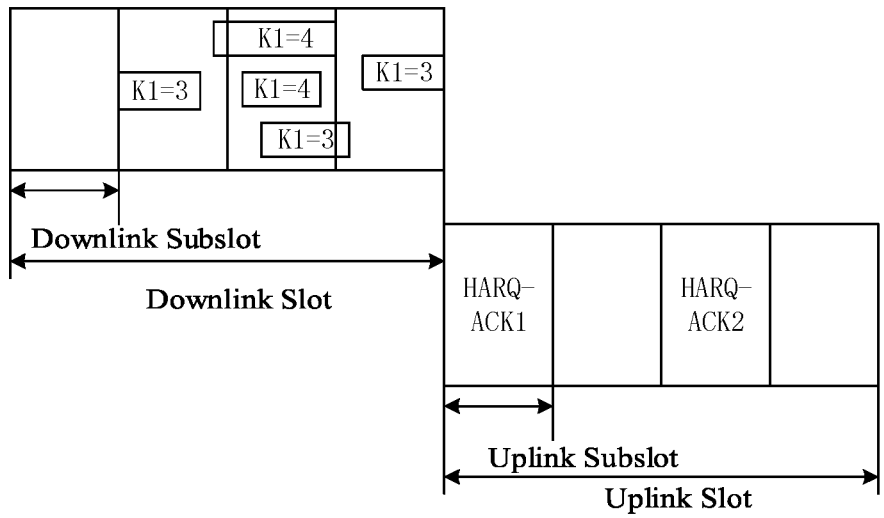
FIG. 3 is a schematic diagram of determined slots of another HARQ-ACK codebook according to an embodiment of the present application.

With respect to FIG. 2, FIG. 3 shows the case where the set of k1 takes the value {3, 4} and UE feeds back HARQ-ACK twice in an uplink slot. FIG. 3 is a schematic diagram of determined slots of another HARQ-ACK codebook according to an embodiment of the present application. As shown in FIG. 3, HARQ-ACK information included in the first semi-static HARQ-ACK codebook (i.e., HARQ-ACK1 in FIG. 3) sequentially includes: the one piece of HARQ-ACK information in the 2nd downlink subslot. HARQ-ACK information contained in the second semi-static HARQ-ACK codebook (i.e., HARQ-ACK2 in FIG. 3) sequentially includes: the one piece of HARQ-ACK information in the 3rd downlink subslot, and the one piece of HARQ-ACK information in the 4th downlink subslot.

Scenario 2

The preset rule includes: taking a downlink subslot where a start position of a PDSCH candidate resource with the latest start position in the candidate resource group is located as the downlink subslot corresponding to the HARQ-ACK information.

In FIG. 2, HARQ-ACK of the first group of PDSCHs corresponds to the second subslot, HARQ-ACK of the second group of PDSCH candidate resources corresponds to the third subslot, and HARQ-ACK of the third group of PDSCH candidate resources corresponds to the fourth subslot. In this case, if one piece of HARQ-ACK information is generated for one group of PDSCH candidate resources, then one piece of HARQ-ACK information is generated in the second downlink subslot, one piece of HARQ-ACK information is generated in the third downlink subslot, and one piece of HARQ-ACK information is generated in the fourth downlink subslot.

In FIG. 2, for the first downlink subslot, when the semi-static HARQ-ACK codebook is in the first uplink subslot, since there is a value of k1=4, it is also considered as a downlink subslot corresponding to the semi-static HARQ-ACK codebook, and at this time, since there is no corresponding PDSCH or candidate resource group, NACK may be generated and filled in the semi-static HARQ-ACK codebook. However, the best solution is to remove such a subslot (the first downlink subslot) from the subslots for which HARQ-ACK information is generated (i.e., no corresponding HARQ-ACK is generated for such a subslot), when generating the semi-static HARQ-ACK codebook, since no corresponding PDSCH exists therein or since no HARQ-ACK for a candidate resource group is counted therein. In this manner, the HARQ-ACK overhead can be reduced.

According to the above method, the HARQ-ACK information contained in the semi-static HARQ-ACK codebook generated in Scenario 2 sequentially includes: the one piece of HARQ-ACK information of the 2nd downlink subslot, the one piece of HARQ-ACK information of the 3rd downlink subslot, and the one piece of HARQ-ACK information of the 4th downlink subslot.

With respect to FIG. 2, in the case where the set of k1 takes the value {3, 4} and UE feeds back HARQ-ACK twice in an uplink slot, as shown in FIG. 3, HARQ-ACK information included in the first semi-static HARQ-ACK codebook (i.e., HARQ-ACK1 in FIG. 3) at this time sequentially includes: the one piece of HARQ-ACK information in the 2nd downlink subslot. HARQ-ACK information contained in the second semi-static HARQ-ACK codebook (i.e., HARQ-ACK2 in FIG. 3) sequentially includes: the one piece of HARQ-ACK information in the 3rd downlink subslot, and the one piece of HARQ-ACK information in the 4th downlink subslot.

Scenario 3

The preset rule includes: taking a downlink subslot where an end position of a PDSCH candidate resource with the latest end position in the candidate resource group is located as the downlink subslot corresponding to the HARQ-ACK information.

In FIG. 2, HARQ-ACK of the first group of PDSCH candidate resources corresponds to the second subslot, HARQ-ACK of the second group of PDSCH candidate resources corresponds to the fourth subslot, and HARQ-ACK for the third group of PDSCH corresponds to the fourth subslot. In the 4th subslot, there are 2 groups of PDSCH candidate resources having no overlapped time domain. In this case, if one piece of HARQ-ACK information is generated for one group of PDSCH candidate resources, then one piece of HARQ-ACK information is generated in the second downlink subslot, and one piece of HARQ-ACK information is generated in the fourth downlink subslot.

In FIG. 2, for the first and third downlink subslots, when the semi-static HARQ-ACK codebook is in the first uplink subslot, since there are values of k1=4 and k1=2, they are also considered as downlink subslots corresponding to the semi-static HARQ-ACK codebook, and at this time, since there is no corresponding PDSCH candidate resource or candidate resource group, NACK may be generated and filled in the semi-static HARQ-ACK codebook. However, the best solution is to remove such subslots (the first and third downlink subslots) from the subslots for which HARQ-ACK information is generated (i.e., no corresponding HARQ-ACK is generated for such subslots), when generating the semi-static HARQ-ACK codebook, since no corresponding PDSCH exists therein or since no HARQ-ACK for a candidate resource group is counted therein. In this manner, the HARQ-ACK overhead can be reduced.

The third subslot is explained here: there is an allocated PDSCH candidate resource in the third subslot, but since the PDSCH candidate resource has an overlapped time domain with other PDSCH candidate resources, the PDSCH candidate resource is included in one candidate resource group; and since HARQ-ACK of PDSCH candidate resources in that group is counted into the fourth subslot according to the rule, the final result is that although there is an allocated PDSCH in the third subslot, the HARQ-ACK of the PDSCH candidate resource is counted into another subslot, and the third subslot does not need to feed back HARQ-ACK in the semi-static HARQ-ACK codebook again.

According to the above method, the HARQ-ACK information contained in the semi-static HARQ-ACK codebook generated in Scenario 3 sequentially includes: the one piece of HARQ-ACK information of the 2nd downlink subslot, and the two pieces of HARQ-ACK information of the 4th downlink subslot.

With respect to FIG. 2, in the case where the set of k1 takes the value {3, 4} and UE feeds back HARQ-ACK twice in an uplink slot, as shown in FIG. 3, HARQ-ACK information included in the first semi-static HARQ-ACK codebook (i.e., HARQ-ACK1 in FIG. 3) at this time sequentially includes: the one piece of HARQ-ACK information in the 2nd downlink subslot. HARQ-ACK information contained in the second semi-static HARQ-ACK codebook (i.e., HARQ-ACK2 in FIG. 3) sequentially includes: the two pieces of HARQ-ACK information in the 4th downlink subslot.

Scenario 4

The preset rule includes: taking a downlink subslot where an end position of a PDSCH candidate resource with the earliest start position in the candidate resource group is located as the downlink subslot corresponding to the HARQ-ACK information.

In FIG. 2, HARQ-ACK of the first group of PDSCH candidate resources corresponds to the second subslot, HARQ-ACK of the second group of PDSCH candidate resources corresponds to the third subslot, and HARQ-ACK of the third group of PDSCH candidate resources corresponds to the fourth subslot. In this case, if one piece of HARQ-ACK information is generated for one group of PDSCH candidate resources, then one piece of HARQ-ACK information is generated in the second downlink subslot, one piece of HARQ-ACK information is generated in the third downlink subslot, and one piece of HARQ-ACK information is generated in the fourth downlink subslot.

In FIG. 2, for the first downlink subslot, when the semi-static HARQ-ACK codebook is in the first uplink subslot, since there is a value of k1=4, it is also considered as a downlink subslot corresponding to the semi-static HARQ-ACK codebook, and at this time, since there is no corresponding PDSCH or candidate resource group, NACK may be generated and filled in the semi-static HARQ-ACK codebook. However, the best solution is to remove such a subslot (the first downlink subslot) from the subslots for which HARQ-ACK information is generated (i.e., no corresponding HARQ-ACK is generated for such a subslot), when generating the semi-static HARQ-ACK codebook, since no corresponding PDSCH exists therein or since no HARQ-ACK for a candidate resource group is counted therein. In this manner, the HARQ-ACK overhead can be reduced.

According to the above method, the HARQ-ACK information contained in the semi-static HARQ-ACK codebook generated in Scenario 4 sequentially includes: the one piece of HARQ-ACK information of the 2nd downlink subslot, the one piece of HARQ-ACK information of the 3rd downlink subslot, and the one piece of HARQ-ACK information of the 4th downlink subslot.

With respect to FIG. 2, in the case where the set of k1 takes the value {3, 4} and UE feeds back HARQ-ACK twice in an uplink slot, as shown in FIG. 3, HARQ-ACK information included in the first semi-static HARQ-ACK codebook (i.e., HARQ-ACK1 in FIG. 3) at this time sequentially includes: the one piece of HARQ-ACK information in the 2nd downlink subslot. HARQ-ACK information contained in the second semi-static HARQ-ACK codebook (i.e., HARQ-ACK2 in FIG. 3) sequentially includes: the one piece of HARQ-ACK information in the 3rd downlink subslot, and the one piece of HARQ-ACK information in the 4th downlink subslot.

Scenario 5

The preset rule includes: taking a downlink subslot where an end position of a PDSCH candidate resource with the latest start position in the candidate resource group is located as the downlink subslot corresponding to the HARQ-ACK information.

In FIG. 2, HARQ-ACK of the first group of PDSCH candidate resources corresponds to the second subslot, HARQ-ACK of the second group of PDSCH candidate resources corresponds to the fourth subslot, and HARQ-ACK of the third group of PDSCH candidate resources corresponds to the fourth subslot. In the 4th subslot, there are 2 groups of PDSCH candidate resources having no overlapped time domain. In this case, if one piece of HARQ-ACK information is generated for one group of PDSCH candidate resources, then one piece of HARQ-ACK information is generated in the second downlink subslot, and one piece of HARQ-ACK information is generated in the fourth downlink subslot.

In FIG. 2, for the first and third downlink subslots, when the semi-static HARQ-ACK codebook is in the first uplink subslot, since there are values of k1=4 and k1=2, they are also considered as downlink subslots corresponding to the semi-static HARQ-ACK codebook, and at this time, since there is no corresponding PDSCH or candidate resource group, NACK may be generated and filled in the semi-static HARQ-ACK codebook. However, the best solution is to remove such subslots (the first and third downlink subslots) from the subslots for which HARQ-ACK information is generated (i.e., no corresponding HARQ-ACK is generated for such a subslot), when generating the semi-static HARQ-ACK codebook, since no corresponding PDSCH exists therein or since no HARQ-ACK for a candidate resource group is counted therein. In this manner, the HARQ-ACK overhead can be reduced.

The third subslot is explained here: there is an allocated PDSCH candidate resource in the third subslot, but since the PDSCH has an overlapped time domain with other PDSCHs, the PDSCH candidate resource is included in one candidate resource group; and since HARQ-ACK of PDSCH candidate resources in that group is counted into the fourth subslot according to the rule, the final result is that although there is an allocated PDSCH candidate resources in the third subslot, the HARQ-ACK of the PDSCH candidate resource is counted into another subslot, and the third subslot does not need to feed back HARQ-ACK in the semi-static HARQ-ACK codebook again.

According to the above method, the HARQ-ACK information contained in the semi-static HARQ-ACK codebook generated in Scenario 5 sequentially includes: the one piece of HARQ-ACK information of the 2nd downlink subslot, and the two pieces of HARQ-ACK information of the 4th downlink subslot.

With respect to FIG. 2, in the case where the set of k1 takes the value {3, 4} and UE feeds back HARQ-ACK twice in an uplink slot, as shown in FIG. 3, HARQ-ACK information included in the first semi-static HARQ-ACK codebook (i.e., HARQ-ACK1 in FIG. 3) at this time sequentially includes: the one piece of HARQ-ACK information in the 2nd downlink subslot. HARQ-ACK information contained in the second semi-static HARQ-ACK codebook (i.e., HARQ-ACK2 in FIG. 3) sequentially includes: the two pieces of HARQ-ACK information in the 4th downlink subslot.

Scenario 6

The preset rule includes: taking a downlink subslot where a start position of a PDSCH candidate resource with the earliest end position in the candidate resource group is located as the downlink subslot corresponding to the HARQ-ACK information.

In FIG. 2, HARQ-ACK of the first group of PDSCH candidate resources corresponds to the second subslot, HARQ-ACK of the second group of PDSCH candidate resources corresponds to the third subslot, and HARQ-ACK of the third group of PDSCH candidate resources corresponds to the fourth subslot. In this case, if one piece of HARQ-ACK information is generated for one group of PDSCH candidate resources, then one piece of HARQ-ACK information is generated in the second downlink subslot, one piece of HARQ-ACK information is generated in the third downlink subslot, and one piece of HARQ-ACK information is generated in the fourth downlink subslot.

In FIG. 2, for the first downlink subslot, when the semi-static HARQ-ACK codebook is in the first uplink subslot, since there is a value of k1=4, it is also considered as a downlink subslot corresponding to the semi-static HARQ-ACK codebook, and at this time, since there is no corresponding PDSCH candidate resource or candidate resource group, NACK may be generated and filled in the semi-static HARQ-ACK codebook. However, the best solution is to remove such a subslot (the first downlink subslot) from the subslots for which HARQ-ACK information is generated (i.e., no corresponding HARQ-ACK is generated for such a subslot), when generating the semi-static HARQ-ACK codebook, since no corresponding PDSCH exists therein or since no HARQ-ACK for a candidate resource group is counted therein. In this manner, the HARQ-ACK overhead can be reduced.

According to the above method, the HARQ-ACK information contained in the semi-static HARQ-ACK codebook generated in Scenario 6 sequentially includes: the one piece of HARQ-ACK information of the 2nd downlink subslot, the one piece of HARQ-ACK information of the 3rd downlink subslot, and the one piece of HARQ-ACK information of the 4th downlink subslot.

With respect to FIG. 2, in the case where the set of k1 takes the value {3, 4} and UE feeds back HARQ-ACK twice in a uplink slot, as shown in FIG. 3, HARQ-ACK information included in the first semi-static HARQ-ACK codebook (i.e., HARQ-ACK1 in FIG. 3) at this time sequentially includes: the one piece of HARQ-ACK information in the 2nd downlink subslot. HARQ-ACK information contained in the second semi-static HARQ-ACK codebook (i.e., HARQ-ACK2 in FIG. 3) sequentially includes: the one piece of HARQ-ACK information in the 3rd downlink subslot, and the one piece of HARQ-ACK information in the 4th downlink subslot.

Scenario 7

The preset rule includes: taking a downlink subslot where a start position of a PDSCH candidate resource with the latest end position in the candidate resource group is located as the downlink subslot corresponding to the HARQ-ACK information.

In FIG. 2, HARQ-ACK of the first group of PDSCH candidate resources corresponds to the second subslot, HARQ-ACK of the second group of PDSCH candidate resources corresponds to the third subslot, and HARQ-ACK of the third group of PDSCH candidate resources corresponds to the fourth subslot. In this manner, if one piece of HARQ-ACK information is generated for one group of PDSCH candidate resources, then one piece of HARQ-ACK information is generated in the second downlink subslot, one piece of HARQ-ACK information is generated in the third downlink subslot, and one piece of HARQ-ACK information is generated in the fourth downlink subslot.

In FIG. 2, for the first downlink subslot, when the semi-static HARQ-ACK codebook is in the first uplink subslot, since there is a value of k1=4, it is also considered as a downlink subslot corresponding to the semi-static HARQ-ACK codebook, and at this time, since there is no corresponding PDSCH candidate resource or candidate resource group, NACK may be generated and filled in the semi-static HARQ-ACK codebook. However, the best solution is to remove such a subslot (the first downlink subslot) from the subslots for which HARQ-ACK information is generated (i.e., no corresponding HARQ-ACK is generated for such a subslot), when generating the semi-static HARQ-ACK codebook, since no corresponding PDSCH candidate resource exists therein or since no HARQ-ACK for a candidate resource group is counted therein. In this manner, the HARQ-ACK overhead can be reduced.

According to the above method, the HARQ-ACK information contained in the semi-static HARQ-ACK codebook generated in Scenario 7 sequentially includes: the one piece of HARQ-ACK information of the 2nd downlink subslot, the one piece of HARQ-ACK information of the 3rd downlink subslot, and the one piece of HARQ-ACK information of the 4th downlink subslot.

With respect to FIG. 2, in the case where the set of k1 takes the value {3, 4} and UE feeds back HARQ-ACK twice in a uplink slot, as shown in FIG. 3, HARQ-ACK information included in the first semi-static HARQ-ACK codebook (i.e., HARQ-ACK1 in FIG. 3) at this time sequentially includes: the one piece of HARQ-ACK information in the 2nd downlink subslot. HARQ-ACK information contained in the second semi-static HARQ-ACK codebook (i.e., HARQ-ACK2 in FIG. 3) sequentially includes: the one piece of HARQ-ACK information in the 3rd downlink subslot, and the one piece of HARQ-ACK information in the 4th downlink subslot.

Scenario 8

The preset rule includes: taking a downlink subslot where a start position of a PDSCH candidate resource with the earliest start position in the candidate resource group is located as the downlink subslot corresponding to the HARQ-ACK information.

In FIG. 2, HARQ-ACK of the first group of PDSCH candidate resources corresponds to the second subslot, HARQ-ACK of the second group of PDSCH candidate resources corresponds to the second subslot, and HARQ-ACK of the third group of PDSCH candidate resources corresponds to the fourth subslot. In this manner, if one piece of HARQ-ACK information is generated for one group of PDSCH candidate resources, then one piece of HARQ-ACK information is generated in the second downlink subslot, and one piece of HARQ-ACK information is generated in the fourth downlink subslot.

In FIG. 2, for the first and third downlink subslots, when the semi-static HARQ-ACK codebook is in the first uplink subslot, since there are values of k1=4 and k1=2, they are also considered as downlink subslots corresponding to the semi-static HARQ-ACK codebook, and at this time, since there is no corresponding PDSCH candidate resource or candidate resource group, NACK may be generated and filled in the semi-static HARQ-ACK codebook. However, the best solution is to remove such subslots (the first and third downlink subslots) from the subslots for which HARQ-ACK information is generated (i.e., no corresponding HARQ-ACK is generated for such subslots), when generating the semi-static HARQ-ACK codebook, since no corresponding PDSCH candidate resources exists therein or since no HARQ-ACK for a candidate resource group is counted therein. In this manner, the HARQ-ACK overhead can be reduced.

The third subslot is explained here: there is an allocated PDSCH candidate resource in the third subslot, but since the PDSCH candidate resource has an overlapped time domain with other PDSCH candidate resources, the PDSCH candidate resource is included in one candidate resource group; and since HARQ-ACK of PDSCH candidate resources in that group is counted into the second subslot according to the rule, the final result is that although there is an allocated PDSCH candidate resources in the third subslot, the HARQ-ACK of the PDSCH candidate resource is counted into another subslot, and the third subslot does not need to feed back HARQ-ACK in the semi-static HARQ-ACK codebook again.

According to the above method, the HARQ-ACK information contained in the semi-static HARQ-ACK codebook generated in Scenario 8 sequentially includes: the two pieces of HARQ-ACK information of the 2nd downlink subslot, and the one piece of HARQ-ACK information of the 4th downlink subslot.

With respect to FIG. 2, in the case where the set of k1 takes the value {3, 4} and UE feeds back HARQ-ACK twice in a uplink slot, as shown in FIG. 3, HARQ-ACK information included in the first semi-static HARQ-ACK codebook (i.e., HARQ-ACK1 in FIG. 3) at this time in Scenario 8 sequentially includes: the two pieces of HARQ-ACK information in the 2nd downlink subslot. HARQ-ACK information contained in the second semi-static HARQ-ACK codebook (i.e., HARQ-ACK2 in FIG. 3) sequentially includes: the one piece of HARQ-ACK information in the 4th downlink subslot.

Through the description of the above implementations, those having ordinary skill in the art can clearly understand that the method according to the above embodiment may be implemented by means of software plus a necessary general hardware platform. Obviously, it may also be implemented by hardware, but in most cases, the former is preferable. Based on such understanding, the technical solutions of the present application or portions contributing to the related art may be embodied in the form of a software product, where the computer software product is stored in a storage medium (such as a ROM/RAM, a magnetic disk, and an optical disk), and includes several instructions for enabling a terminal device (which may be a mobile phone, a computer, a server, or a network device, etc.) to execute the method of the embodiments of the present application.

Embodiment 2

Figure 4:
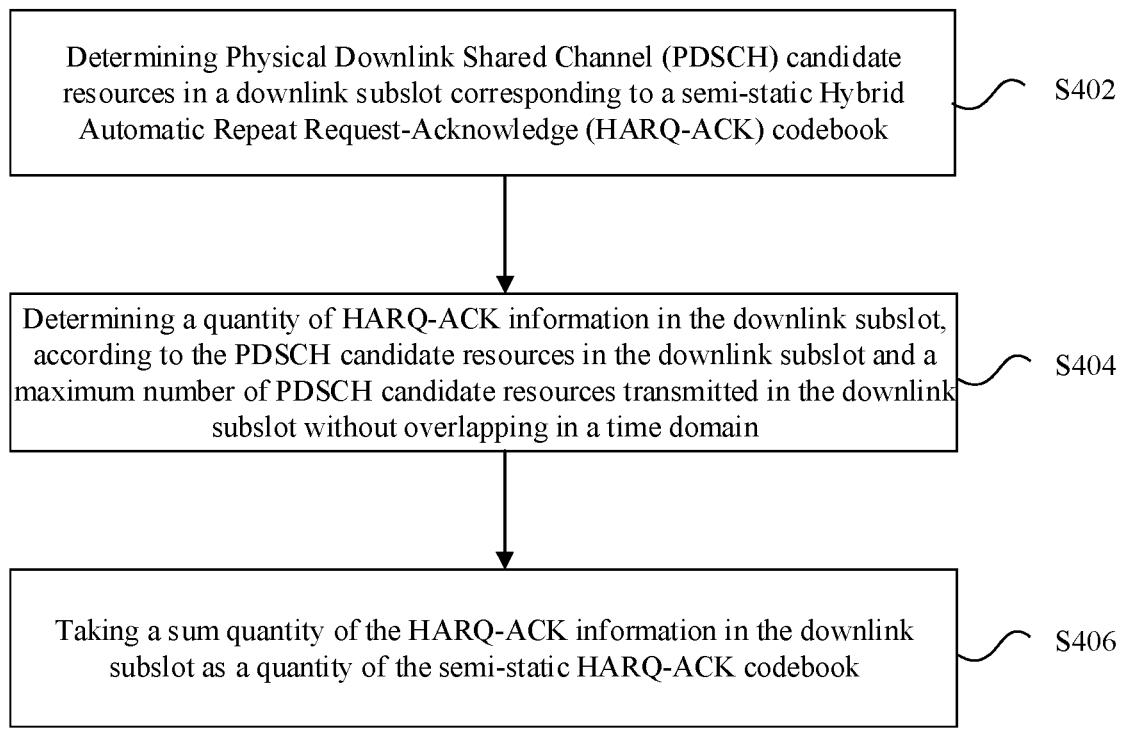
FIG. 4 is a flowchart of determining HARQ-ACK information according to an embodiment of the present application.

In this embodiment, provided is a method for determining HARQ-ACK information. FIG. 4 is a flowchart of determining HARQ-ACK information according to an embodiment of the present application. As shown in FIG. 4, the flow includes the following steps.

At step S402, determining PDSCH candidate resources in a downlink subslot corresponding to a semi-static HARQ-ACK codebook.

At step S404, determining a quantity of HARQ-ACK information in the downlink subslot according to the PDSCH candidate resources in the downlink subslot and a maximum number of PDSCH candidate resources transmitted in the downlink subslot without overlapping in a time domain.

At step S406, taking a sum quantity of the HARQ-ACK information in the downlink subslot as the quantity of the semi-static HARQ-ACK codebooks.

Optionally, determining a PDSCH candidate resource in the downlink subslot corresponding to the semi-static HARQ-ACK codebook includes: determining the PDSCH candidate resource according to a symbol corresponding to an end position of the PDSCH candidate resource in the downlink subslot and/or a symbol corresponding to a start position of the PDSCH candidate resource in the downlink subslot.

Optionally, the step of determining the quantity of HARQ-ACK information in the downlink subslot, according to the PDSCH candidate resources in the downlink subslot and the maximum number of the PDSCH candidate resources transmitted in the downlink subslot without overlapping in the time domain, includes: determining a PDSCH candidate resource with an earliest end position in the slot or the downlink subslot; dividing the PDSCH candidate resource with the earliest end position and a PDSCH candidate resource having an overlapped time domain with the PDSCH candidate resource with the earliest end position into one candidate resource group; and determining the quantity of the HARQ-ACK information in the downlink subslot according to a quantity of the candidate resource groups. The candidate resource group corresponds to one or more pieces of HARQ-ACK information.

For example, each candidate resource group in the downlink subslot may correspond to one piece of HARQ-ACK information, or may correspond to m pieces of HARQ-ACK information, where m is a positive integer greater than 1. Further optionally, the quantity may be configured on both the base station side and the UE side, or may be configured by the base station to the UE through signaling. Apparently, other configurations also fall into the scope of the present embodiment. For example, the base station or UE may be configured by a third party entity.

Optionally, the method further includes: determining a PDSCH candidate resource with the earliest end position among the PDSCH candidate resources in the slot or the downlink subslot except the PDSCH candidate resources divided into the candidate resource group; and dividing the PDSCH candidate resource with the earliest end position and a PDSCH candidate resource having an overlapped time domain with the PDSCH candidate resource with the earliest end position into a new candidate resource group, until all the PDSCH candidate resources in the slot or the downlink subslot are divided into candidate resource groups.

The description is given with reference to FIG. 2 in Embodiment 1, and the description already given is omitted. In FIG. 2, in a downlink subslot corresponding to a semi-static HARQ-ACK codebook, the quantity of HARQ-ACK information generated in the downlink subslot is determined in the following manner. When a configured PDSCH candidate resource exists in the downlink subslot, HARQ-ACK information is generated, and the quantity of the HARQ-ACK information is determined according to the quantity of the PDSCHs having no overlapped time domain and can be transmitted maximally in the subslot.

In FIG. 2, HARQ-ACK is transmitted in the uplink subslot, while the corresponding downlink subslot includes 4 downlink subslots in FIG. 2 (for specific calculation, see the above description). Since no PDSCH candidate resource is allocated to the first downlink subslot, the first downlink subslot is removed from downlink subslots for which the semi-static HARQ-ACK codebook is generated, that is, no HARQ-ACK information is generated for that downlink subslot. Since one PDSCH candidate resource is allocated to the second downlink subslot and has no overlapped time domain with other PDSCH candidate resources, the second downlink subslot is included in the downlink subslots for which the semi-static HARQ-ACK codebook is generated, that is, HARQ-ACK information is generated for that downlink subslot. Since two PDSCH candidate resources are allocated to the third downlink subslot and have an overlapped time domain with each other, and at most one PDSCH candidate resource can be transmitted according to the non-overlapped time domain, the third downlink subslot is included in the downlink subslots for which the semi-static HARQ-ACK codebook is generated, that is, HARQ-ACK information is generated for that downlink subslot. Since two PDSCH candidate resources are allocated to the fourth downlink subslot and have no overlapped time domain with each other, and at most two PDSCH candidate resources can be transmitted in the fourth downlink subslot according to the non-overlapped time domain, the fourth downlink subslot is included in the downlink subslots for which the semi-static HARQ-ACK codebook is generated, that is, HARQ-ACK information is generated for that downlink subslot.

In this document, some features in various embodiments may be shared without conflict, including but not limited to, for example, no HARQ-ACK information is generated or NACK information is filled when the subslot is empty, and how to determine that the subslot is empty, etc.

Through the description of the above implementations, those having ordinary skill in the art can clearly understand that the method according to the above embodiment may be implemented by means of software plus a necessary general hardware platform. Obviously, it may also be implemented by hardware, but in most cases, the former is preferable. Based on such understanding, the technical solutions of the present application or portions contributing to the related art may be embodied in the form of a software product, where the computer software product is stored in a storage medium (such as a ROM/RAM, a magnetic disk, and an optical disk), and includes several instructions for enabling a terminal device (which may be a mobile phone, a computer, a server, or a network device, etc.) to execute the method of the embodiments of the present application.

Embodiment 3

In this embodiment, further provided is an apparatus for determining an HARQ-ACK codebook configured to implement the above embodiments and optional implementations. Details which have been explained will not be repeated here. As used herein, the term "module" may be a combination of software and/or hardware that can realize a preset function. Although the apparatus described in the following embodiment is preferably implemented in software, hardware, or a combination of software and hardware, is also possible and contemplated.

Figure 5:
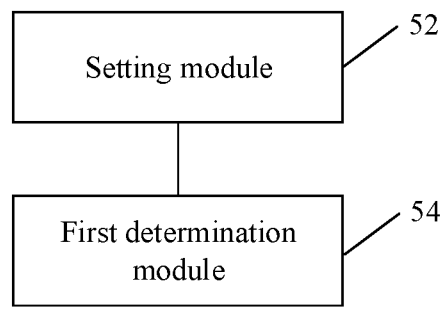
FIG. 5 is a block diagram of an apparatus for determining an HARQ-ACK codebook according to an embodiment of the present application.

FIG. 5 is a block diagram of an apparatus for determining an HARQ-ACK codebook according to an embodiment of the present application. As shown in FIG. 5, the apparatus includes: a setting module 52 configured to set a plurality of PDSCH candidate resources having an overlapped time domain in a downlink slot into one candidate resource group, and determine HARQ-ACK information corresponding to the candidate resource group; and a first determination module 54 configured to determine a corresponding downlink subslot for the HARQ-ACK information according to a preset rule, and determine a semi-static HARQ-ACK codebook.

It should be noted that each of the above modules may be implemented by software or hardware. For the latter, it may be implemented by, but are not limited to: the above modules all located in the same processor; or the above modules each located in different processors in any combination.

Embodiment 4

In an embodiment, further provided is an apparatus for determining HARQ-ACK information configured to implement the above embodiments and optional implementations. Details which have been explained will not be repeated here. As used herein, the term "module" may be a combination of software and/or hardware that can realize a preset function. Although the apparatus described in the following embodiment is preferably implemented in software, hardware, or a combination of software and hardware, is also possible and contemplated.

Figure 6:
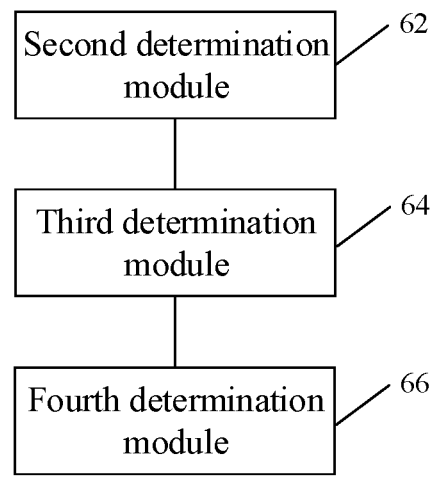
FIG. 6 is a block diagram of an apparatus for determining HARQ-ACK information according to an embodiment of the present application.

FIG. 6 is a block diagram of an apparatus for determining HARQ-ACK information according to an embodiment of the present application. As shown in FIG. 6, the apparatus includes: a second determination module 62 configured to determine PDSCH candidate resources in a downlink subslot corresponding to a semi-static HARQ-ACK codebook; a third determination module 64 configured to determine a quantity of HARQ-ACK information in the downlink subslot, according to the PDSCH candidate resources in the downlink subslot and a maximum number of PDSCH candidate resources transmitted in the downlink subslot without overlapping in a time domain; and a fourth determination module 66 configured to take a sum quantity of the HARQ-ACK information in the downlink subslot as a quantity of the semi-static HARQ-ACK codebooks.

It should be noted that each of the above modules may be implemented by software or hardware. For the latter, it may be implemented by, but are not limited to: the above modules all located in the same processor; or the above modules each located in different processors in any combination.

Embodiment 5

An embodiment of the present application further provides a storage medium having a computer program stored thereon. The computer program is configured to be executed to cause steps of any one of the above method embodiments to be implemented.

Optionally, in this embodiment, the storage medium may be configured to store a computer program for implementing the following steps.

At step S1, setting a plurality of PDSCH candidate resources having an overlapped time domain in a downlink slot into one candidate resource group, and determining HARQ-ACK information corresponding to the candidate resource group; and at step S2, determining a corresponding downlink subslot for the HARQ-ACK information according to a preset rule, and determining a semi-static HARQ-ACK codebook.

Or at step S1, determining PDSCH candidate resources in a downlink subslot corresponding to a semi-static HARQ-ACK codebook; at step S2, determining a quantity of HARQ-ACK information in the downlink subslot, according to the PDSCH candidate resources in the downlink subslot and a maximum number of PDSCH candidate resources transmitted in the downlink subslot without overlapping in a time domain; and at step S3, taking a sum quantity of the HARQ-ACK information in the downlink subslot as a quantity of the semi-static HARQ-ACK codebooks.

Optionally, in this embodiment, the storage medium may include, but is not limited to: a U disk, a read only memory (ROM), a random access memory (RAM), a removable hard disk, a disk or optical disk, and other media that can store a computer program.

An embodiment of the present application further provides an electronic apparatus, including a memory and a processor. The memory has a computer program stored thereon, and the processor is configured to execute the computer program to perform steps of any of the method embodiments as described above.

Optionally, the electronic apparatus may further include a transmission device and an input/output device. The transmission device is coupled to the processor, and the input/output device is coupled to the processor.

Optionally, in the embodiment, the processor may be configured to execute the computer program to implement the following steps.

At step S1, setting a plurality of PDSCH candidate resources having an overlapped time domain in a downlink slot into one candidate resource group, and determining HARQ-ACK information corresponding to the candidate resource group; and at step S2, determining a corresponding downlink subslot for the HARQ-ACK information according to a preset rule, and determining a semi-static HARQ-ACK codebook.

Or at step S1, determining PDSCH candidate resources in a downlink subslot corresponding to a semi-static HARQ-ACK codebook; at step S2, determining a quantity of HARQ-ACK information in the downlink subslot, according to the PDSCH candidate resources in the downlink subslot and a maximum number of PDSCH candidate resources transmitted in the downlink subslot without overlapping in a time domain; and at step S3, taking a sum quantity of the HARQ-ACK information in the downlink subslot as a quantity of the semi-static HARQ-ACK codebooks.

Optionally, specific examples in the present embodiment may refer to the examples described in the foregoing embodiments and alternative implementations, which will not be repeated in the present embodiment.

Obviously, a person having ordinary skill in the art would understand that the above modules and steps of the present application can be realized by using a universal computing device, can be integrated in a single computing device or distributed on a network that consists of a plurality of computing devices; and alternatively, they can be realized by using the executable program code of the computing device, so that they can be stored in a storage device and executed by the computing device, in some cases, can perform the shown or described steps in a sequence other than herein, or they are made into various integrated circuit modules respectively, or a plurality of modules or steps thereof are made into a single integrated circuit module, thus to be realized. Thus, the present application is not limited to any specific combination of hardware and software.

The above are merely optional embodiments of the present application, which are not intended to restrict the present application. For those having ordinary skill in the art, the present application may have various changes and variations. Any amendments, equivalent substitutions, improvements, etc. within the principle of the present application are included in the scope of protection defined by the appended claims of the present application.

INDUSTRIAL APPLICABILITY

By means of the present application, the problem that a semi-static HARQ-ACK codebook cannot be determined when a PDSCH candidate resource is cross-subslot is solved, thereby yielding the effect of meeting the HARQ-ACK requirement in the case that the PDSCH candidate resource is cross-subslot.

The invention claimed is:

1. A method for determining a Hybrid Automatic Repeat Request-Acknowledge (HARQ-ACK) codebook, comprising:
   setting a plurality of physical downlink shared channel (PDSCH) candidate resources having an overlapped time domain in a downlink slot into one or more candidate resource groups, and determining HARQ-ACK information corresponding to the one or more candidate resource groups; and determining a semi-static HARQ-ACK codebook according to the HARQ-ACK information;
   wherein the PDSCH candidate resources are determined in response to that an end symbol of each of the PDSCH candidate resources is within subslots,
   the subslots comprise previous subslots n-k1 in response to that the semi-static HARQ-ACK codebook is transmitted in a subslot n,
   k1 is a value set of a parameter of HARQ-ACK timing, and a value of the parameter of HARQ-ACK timing is in units of subslots.

2. The method according to claim 1, wherein determining the HARQ-ACK information corresponding to the one or more candidate resource groups comprises:
   determining, for each candidate resource group in a downlink subslot of the downlink slot, a position, in the downlink subslot, of the HARQ-ACK information corresponding to the candidate resource group, according to the PDSCH candidate resource with an earliest end position in the candidate resource group.

3. The method according to claim 1, wherein determining the semi-static HARQ-ACK codebook comprises:
   counting the HARQ-ACK information corresponding to each candidate resource group into a downlink subslot of the downlink slot, and determining a position of the HARQ-ACK information corresponding to the candidate resource group in the semi-static HARQ-ACK codebook according to a sequence of downlink subslots of the downlink slot.

4. The method according to claim 1, wherein setting the plurality of PDSCH candidate resources having the overlapped time domain in the downlink slot into the one or more candidate resource groups comprises:
   determining the PDSCH candidate resource with an earliest end position in the downlink slot; and
   dividing the PDSCH candidate resource with the earliest end position and the PDSCH candidate resource having an overlapped time domain with the PDSCH candidate resource with the earliest end position into one candidate resource group.

5. The method according to claim 4, further comprising:
   determining the PDSCH candidate resource with an earliest end position among the PDSCH candidate resources in the downlink slot except the PDSCH candidate resources divided into the candidate resource group; and
   dividing the PDSCH candidate resource with the earliest end position and the PDSCH candidate resource having an overlapped time domain with the PDSCH candidate resource with the earliest end position into another candidate resource group, until all the PDSCH candidate resources in the downlink slot are divided into the candidate resource groups.

6. The method according to claim 1, wherein
   when a downlink sub slot in the downlink slot is empty, NACK information is filled into the semi-static HARQ-ACK codebook, or HARQ-ACK information of 0 bits is determined in the downlink subslot.

7. The method according to claim 6, wherein the downlink subslot is determined to be empty by one of:
   determining that there is no PDSCH candidate resource or candidate resource group in the downlink subslot, and there is no counted PDSCH candidate resource or candidate resource group in the downlink subslot; or
   determining that any PDSCH candidate resource or candidate resource group exists in the downlink subslot but is prohibited from being counted in the downlink subslot, and there is no counted PDSCH candidate resource or candidate resource group in the downlink subslot.

8. The method according to claim 7, wherein determining that any PDSCH candidate resource or candidate resource group exists in the downlink subslot comprises:
   determining that a symbol corresponding to an end position of the PDSCH candidate resource exists in the downlink subslot, and/or determining that a symbol corresponding to a start position of the PDSCH candidate resource exists in the downlink subslot.

9. The method according to claim 6, wherein the downlink subslot is determined to be non-empty by one of:
    determining that any counted candidate resource group exists in the downlink subslot; or
    determining that any PDSCH candidate resource or candidate resource group exists in the downlink subslot, and the PDSCH candidate resource or candidate resource group is not counted in another downlink subslot.

10. The method according to claim 3, further comprising:
    determining, when any candidate resource group of another downlink subslot is counted in the downlink subslot, HARQ-ACK information corresponding to the counted candidate resource group in the downlink subslot, and determining a position of the HARQ-ACK information in the semi-static HARQ-ACK codebook.

11. A method for determining Hybrid Automatic Repeat Request-Acknowledge (HARQ-ACK) information, comprising:
    determining Physical Downlink Shared Channel (PDSCH) candidate resources in a downlink subslot corresponding to a semi-static HARQ-ACK codebook;
    determining a quantity of HARQ-ACK information in the downlink subslot, according to the PDSCH candidate resources in the downlink subslot and a maximum number of PDSCH candidate resources transmitted in the downlink subslot without overlapping in a time domain; and
    taking a sum quantity of the HARQ-ACK information in the downlink subslot as a quantity of the semi-static HARQ-ACK codebook.

12. The method according to claim 11, wherein determining a PDSCH candidate resource in the downlink subslot corresponding to the semi-static HARQ-ACK codebook comprises:
    determining the PDSCH candidate resource according to a symbol corresponding to an end position of the PDSCH candidate resource in the downlink subslot and/or a symbol corresponding to a start position of the PDSCH candidate resource in the downlink subslot.

13. The method according to claim 11, wherein determining the quantity of HARQ-ACK information in the downlink subslot, according to the PDSCH candidate resources in the downlink subslot and the maximum number of the PDSCH candidate resources transmitted in the downlink subslot without overlapping in the time domain, comprises:
    determining a PDSCH candidate resource with an earliest end position in the slot or the downlink subslot;
    dividing the PDSCH candidate resource with the earliest end position and a PDSCH candidate resource having an overlapped time domain with the PDSCH candidate resource with the earliest end position into one candidate resource group; and
    determining the quantity of the HARQ-ACK information in the downlink subslot according to a quantity of the candidate resource groups, wherein the candidate resource group corresponds to one or more pieces of HARQ-ACK information.

14. The method according to claim 13, further comprising:
    determining a PDSCH candidate resource with an earliest end position among the PDSCH candidate resources in the slot or the downlink subslot except the PDSCH candidate resources divided into the candidate resource group; and
    dividing the PDSCH candidate resource with the earliest end position and a PDSCH candidate resource having an overlapped time domain with the PDSCH candidate resource with the earliest end position into a new candidate resource group, until all the PDSCH candidate resources in the slot or the downlink subslot are divided into candidate resource groups.

15. A non-transitory computer-readable storage medium having a computer program stored thereon, wherein the computer program is configured to, when executed, cause the processor to implement the method according to claim 1.

16. An electronic apparatus, comprising a memory and a processor, wherein the memory has a computer program stored thereon, and the processor is configured to execute the computer program to implement the method according to claim 1.

17. A non-transitory computer-readable storage medium having a computer program stored thereon, wherein the computer program is configured to, when executed, cause the processor to implement the method according to claim 11.

18. An apparatus for determining a Hybrid Automatic Repeat Request-Acknowledge, HARQ-ACK, codebook, comprising:
    a setting module configured to set a plurality of physical downlink shared channel, PDSCH, candidate resources having an overlapped time domain in a downlink slot into one or more candidate resource groups, and determine HARQ-ACK information corresponding to the one or more candidate resource group; and
    a first determination module configured to determine a semi-static HARQ-ACK codebook according to the HARQ-ACK information,
    wherein the PDSCH candidate resources are determined in response to that an end symbol of each of the PDSCH candidate resources is within previous subslots n-k1 in response to that the semi-static HARQ-ACK codebook is transmitted in a subslot n,
    k1 is a value set of a parameter of HARQ-ACK timing, and a value of the parameter of HARQ-ACK timing is in units of subslots.

19. The apparatus according to claim 18, wherein the setting module is configured to:
    determine the PDSCH candidate resource with an earliest end position in the downlink slot; and
    divide the PDSCH candidate resource with the earliest end position and the PDSCH candidate resource having an overlapped time domain with the PDSCH candidate resource with the earliest end position into one candidate resource group.

20. The apparatus according to claim 19, wherein the setting module is further configured to:
    determine the PDSCH candidate resource with an earliest end position among the PDSCH candidate resources in the downlink slot except the PDSCH candidate resources divided into the candidate resource group; and
    divide the PDSCH candidate resource with the earliest end position and the PDSCH candidate resource having an overlapped time domain with the PDSCH candidate resource with the earliest end position into another candidate resource group, until all the PDSCH candidate resources in the downlink slot are divided into the candidate resource groups.

* * * * *